(12) United States Patent
Jones

(10) Patent No.: US 6,951,138 B1
(45) Date of Patent: Oct. 4, 2005

(54) METHOD AND APPARATUS FOR AN OCEAN BOTTOM SEISMIC ACQUISITION TECHNIQUE

(75) Inventor: Neil Jones, Richmond (GB)

(73) Assignee: WesternGeco L.L.C., Houston, TX (US)

(*) Notice: Subject to any disclaimer, the term of this patent is extended or adjusted under 35 U.S.C. 154(b) by 477 days.

(21) Appl. No.: 09/703,774

(22) Filed: Nov. 1, 2000

(51) Int. Cl.[7] ............................. G01B 7/16; H04R 17/00
(52) U.S. Cl. ........................................ 73/769; 367/159
(58) Field of Search ...................... 73/769; 367/159, 367/164, 134

(56) References Cited

U.S. PATENT DOCUMENTS

| | | | |
|---|---|---|---|
| 4,069,469 A | * | 1/1978 | Masaharu .................... 367/133 |
| 4,138,658 A | * | 2/1979 | Avedik et al. ................. 367/15 |
| 5,687,137 A | * | 11/1997 | Schmidt et al. ............. 367/131 |
| 5,894,450 A | * | 4/1999 | Schmidt et al. ............. 367/134 |
| 6,002,648 A | * | 12/1999 | Ambs .......................... 367/159 |
| 6,044,745 A | | 4/2000 | Hickey ....................... 89/1.809 |

FOREIGN PATENT DOCUMENTS

| | | |
|---|---|---|
| EP | 0154968 | 9/1985 |
| EP | 0591854 | 4/1994 |

* cited by examiner

*Primary Examiner*—Edward Lefkowitz
*Assistant Examiner*—Lilybett Martir
(74) *Attorney, Agent, or Firm*—Madan, Mossman & Sriram, P.C.

(57) ABSTRACT

A seismometer having a hydrodynamically efficient shaped body containing a seismic sensor or source, having a propulsion unit located and a control unit for directional control of the propulsion unit for guiding the seismometer to and from an ocean floor. The seismometer can be deployed from a surface ship, helicopter or airplane. The seismometer or surface support vessel contains a navigation unit for directing the control unit to a desired location on the ocean bottom. The apparatus provides a storage device for storing seismic data sensed by the seismic sensor. The navigation system sends a responsive directional command to the apparatus based on the current location and the desired location. Upon arrival at the desired ocean bottom location, the propulsion system acts to couple the apparatus to the ocean floor. A flight control system manages a plurality of the seismometers during navigation to and from the a ocean bottom.

20 Claims, 4 Drawing Sheets

METHOD AND APPARATUS FOR AN OCEAN BOTTOM SEISMIC ACQUISITION TECHNIQUE

BACKGROUND OF THE INVENTION

1. Field of the Invention

The present invention relates to a system and method for deployment of seismic sensors and in particular to the deployment and retrieval of self-propelled, autonomous seismic sensors in an ocean environment.

2. Description of the Related Art

Historically, ocean bottom seismic data acquisition sensor packaging and deployment has taken the form of either self-contained instruments dropped in the water or sensor cables streamed behind a surface support ship. Typically, self-contained seismic instruments are dropped off the back of a surface support ship where they descend under the influence of their own negative buoyancy to drift down through a water column until they contact the sea-floor. This drop and drift system is imprecise and potentially leaves seismic survey areas uncovered. Typically, the seismic instruments have been deployed from the back of a surface support ship or vessel. Alternatively, surface towing vessels have been used for surface support and deployment of ocean bottom cables (OBC) which are dragged or draped over a seabed. In other instances, seismic cables and instruments have been deployed with the aid of remotely controlled vehicles. This remotely controlled procedure is limited by the operational speed and capacity of remotely operated deployment vehicles. Moreover, conventional ship borne seismic cable deployment systems are limited in the number of cables that they feasibly can deploy and accurately control during seismic operations. At a certain point, the number of cables in the water becomes unwieldly. Thus, there is a need for a system that avoids the problems of the prior art.

SUMMARY OF THE INVENTION

The present invention provides self-propelled remotely controlled instruments or multi-component ocean bottom seismometers (MOBS) that are capable of swimming to a designated location on the sea floor, under their own power, and attaching themselves to the sea floor to attain optimal coupling and enhanced multi-component seismic recordings. After completing a survey, the MOBS store the seismic recordings internally and return to a designated location near the sea surface for retrieval by a support vessel or swimming to another sea bottom location for another seismic survey.

The MOBS instruments are self-propelled. The MOBS are guided by a sea-surface and seafloor navigational system, which is well known in the art. A surface vessel communicates with precisely located seafloor navigation buoys and the MOBS to determine the distance between the MOBS, the navigation buoys and the desired location to calculate iterative location commands which are communicated to each MOBS to enable precise navigation commands to steer the MOBS to its desired location. A mechanical system of fins is used to propel the MOBS instruments through a water column. Upon arrival at the ocean bottom, the fins are used to dig into the ocean bottom to improve coupling of the MOBS instruments to the sea floor. As described herein, the ability to affix themselves to the sea floor, in the manner outlined below, provides better coupling of the MOBS instrument seismometer package than has previously been achieved using existing ocean bottom systems. Better coupling provides improved vector fidelity in associated seismic recordings, which is an important enhancing factor in subsequent processing and analysis of shear wave reflection data gathered by the MOBS instruments.

Further, given a sufficient redundancy of the MOBS instruments, an entire three-dimensional seismic recording geometry can be laid out precisely on the sea floor in a relatively short period of time. The present invention deploys the MOBS with minimal logistic and economic cost incurred for support and deployment of the MOBS instruments. Finally, the present invention provides capability for use in areas of extreme water depth and strong tidal currents where convention seismic survey techniques have been less effective.

DETAILED DESCRIPTION OF A PREFERRED EMBODIMENT

Figure 1:
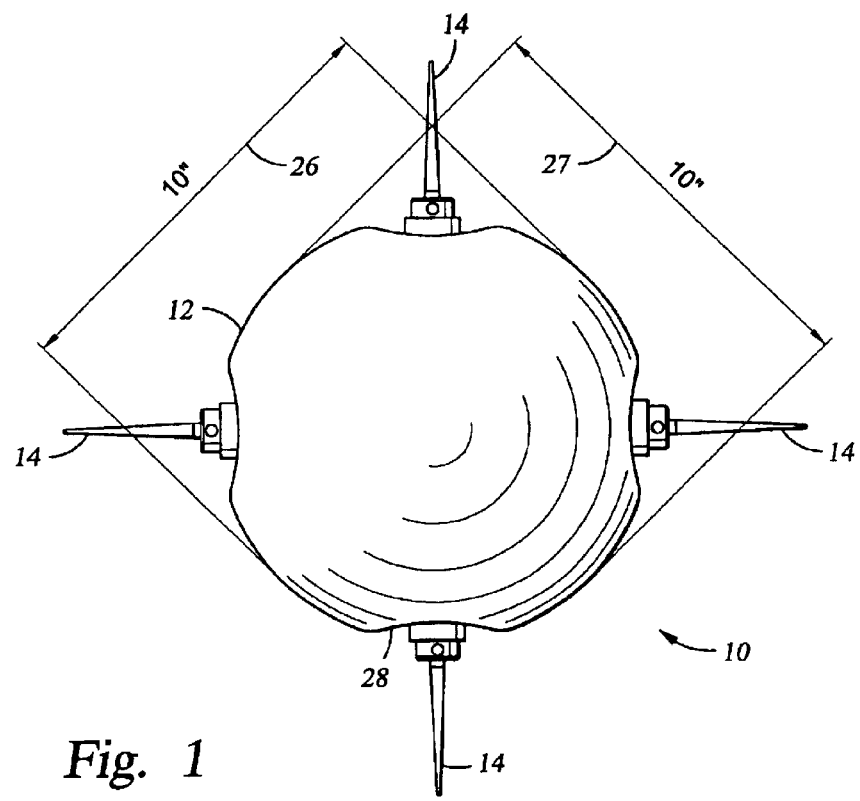
FIG. 1 is a top view of a MOBS instrument of the present invention.
Figure 2:
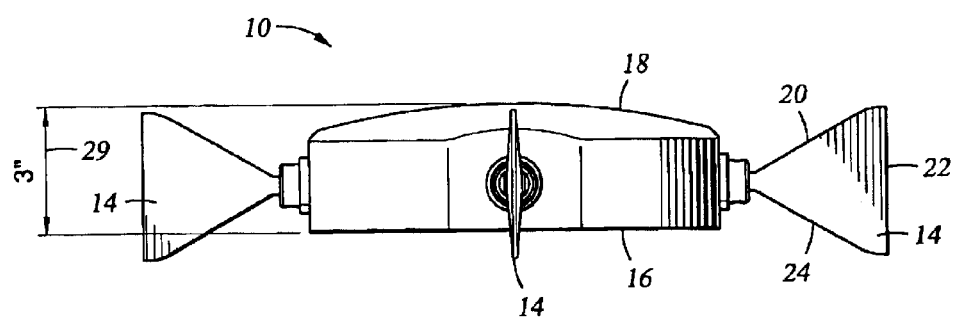
FIG. 2 is a side view of a MOBS instrument of the present invention.
Figure 3:
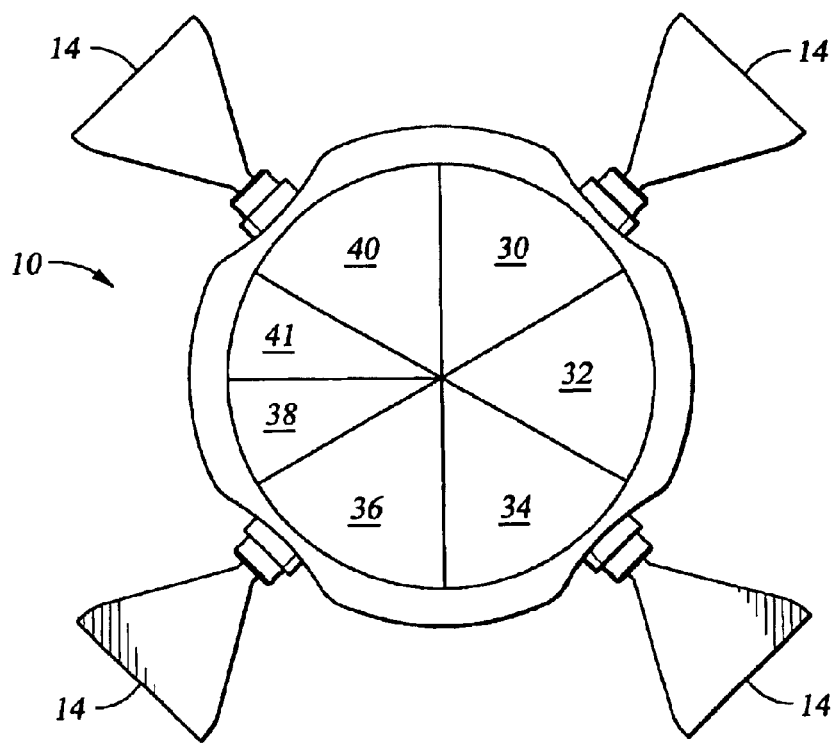
FIG. 3 is a schematic top cross sectional view of a MOBS instruments according to the present invention.
Figure 3A:
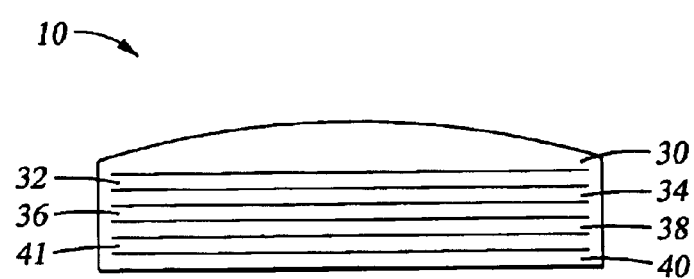
FIG. 3A is a side cross sectional view of the preferred embodiment of the present invention showing that the mass is equally distributed about the vertical axis of the body so that there is no preferred direction.

Turning now to FIG. 1 and FIG. 2, the MOBS 10 provided by the present invention is preferably discoid in shape with a flat bottom 16 and a curved upper surface 18. Any hydrodynamically efficient body shape, however, will work for the present invention. As shown in FIG. 3, the MOBS is schematically compartmentalized into a geophone housing 30, recording housing 32, navigation housing 34, power unit 36, control unit 38, propulsion control unit 40, buoyancy control unit 41 and four propulsion units or fins distributed symmetrically about the geophone frame. FIG. 3A is a side view of the preferred embodiment of the present invention showing that the mass of each MOBS compartment shown schematically in FIG. 3, is equally distributed about the vertical axis of the body or distributed in a balanced fashion so that there is no preferred direction. The preferred dimensions of the instrument are approximately 10.0×10.0×3.0 inches shown by dimension arrows 26, 27 and 29 respectively, as shown in FIGS. 1 and 2. These dimensions however can be adapted to enhance performance under varying water conditions. Larger dimensions may be preferred for more stability in deeper water and stronger currents, and smaller dimensions may be more suitable for alternate environments, where additional mobility is desired, such as in shallow lakes or even in a wellbore.

Figure 4:
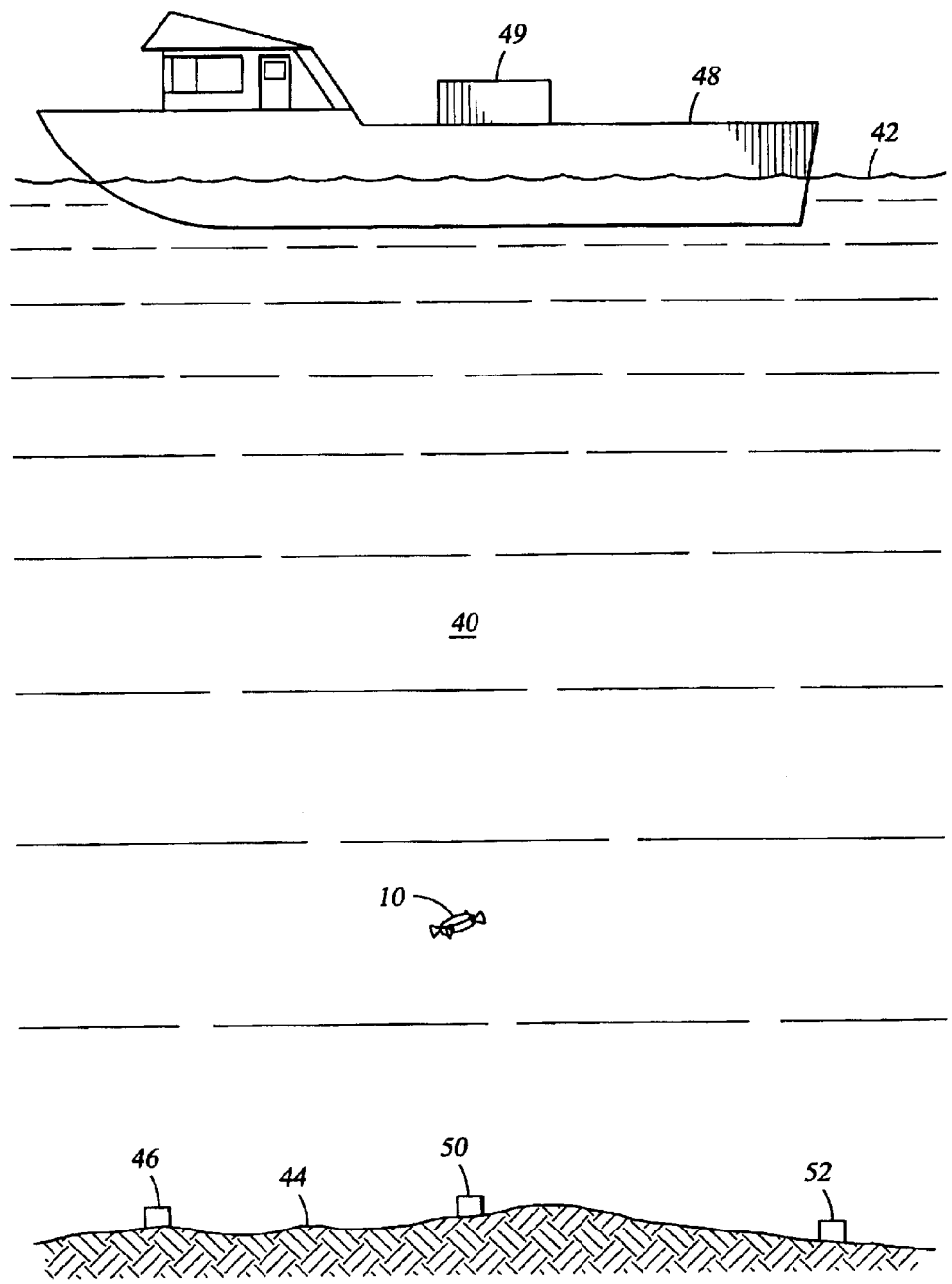
FIG. 4 is an illustration of a navigation system for the MOBS instrument of the present invention.

Any number of MOBS instruments can be deployed at one time from a survey vessel or surface support ship. As shown in FIG. 4, the MOBS are independently controlled so that they can propel themselves or swim using fins 14. The MOBS swim in formation or individually to and from the sea floor and swim to return to a surface support vessel without interfering with each other. A flight control system 49 located on the surface support ship which tracks each MOBS instrument and directs each MOBS individually to prevent collisions. The flight control system directs each MOBS to the surface for retrieval by a surface support ship 48 or in swimming to a new survey location after a completed survey. The surface support vessel navigation system communicates with each MOBS and a sea floor navigation system via acoustic transponders 46, 50 and 52 to locate each MOBS and direct it to the desired location. The MOBS are identifiable by virtue of unique digital interrogation addresses which are communicated between the surface support ship and each MOBS. The surface support ship 48 locates and directs each individual MOBS controlling each MOBS descent and ascent to and from the ocean floor, much like an air traffic controller directs the landing and take off of multiple aircraft. In an alternative embodiment, two surface support vessels communicates directly with each MOBS and eliminates the sea floor transponders.

Figure 5:
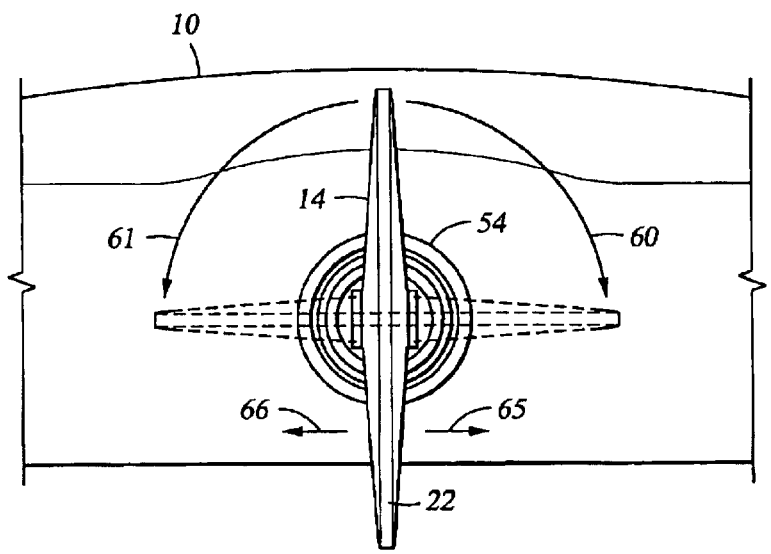
FIGS. 5 and 6 illustrate the preferred propulsion system of the present invention.

As shown in FIGS. 2 and 5, each MOBS fin 14 preferably has a triangular shape with three sides 20, 24 and 22. The vertical side 22 is preferably wider than the thickness dimension between the MOBS top 18 and bottom 16, so that the fins extends beyond the MOBS bottom and top to enhance digging into the ocean floor.

The MOBS can be deployed from the surface ship into the water by any appropriate means including by hand or from a cage or some other mechanical device. Once deployed, each MOBS responds to the surface ship and sea floor transponders array via an acoustic pulse. The MOBS may also relay its current X, Y, Z position and vertical vector to the surface support vessel via acoustic pulses or any other wireless medium.

The surface support ship then sends an instruction to each MOBS such that each MOBS alters its course via successive iterations to converge on its pre-determined location on the ocean floor. MOBS motion and orientation within the water column is controlled by the relative actions of each independent MOBS propulsion unit.

Having propelled the MOBS to the correct X, Y, and Z position, the propulsion fins 14 transform to coupling and orientation units. The fins dig into the sea floor to enhance coupling of the MOBS to the sea floor. On instruction from the surface support ship the coupling units oscillate and dig into the ocean floor to mechanically secure the MOBS 10 to the sea floor 42. The energy expended in this process depends primarily on the local stiffness or density of the sea floor. Each MOBS 10 executes a predetermined coupling and orientation maneuver with fins 14. After coupling itself to the sea floor, the MOBS 10 utilizes its fins to fine tune its attitude so as to level itself with respect to the desired reference horizontal plane relative all other MOBS 10 and the surface support vessel. During this fine tuning stage, controlled oscillation of the fins may also be used to perform an in situ calibration of the coupling response of the sensor package. Each MOBS then sends a message to the surface support vessel indicating that it is ready to record seismic information and remains inactive in a listening mode until an instruction to record is sent from the vessel to become active and record seismic activity.

While a preferred embodiment is shown propelled by fins, any method of propulsion and direction control is acceptable. Alternate propulsion and direction means include but are not limited to transverse mounted propellers located near the center of the MOBS body, transverse mounted propellers having 180 degree rotating mounts about the horizontal and vertical plane respectively and located near the center of the MOBS body, a propeller located near the center of the MOBS having 180 degree rotating mounts about the horizontal and vertical planes, and/or including directional guidance fins. Other means for propulsion are also acceptable.

Figure 6:
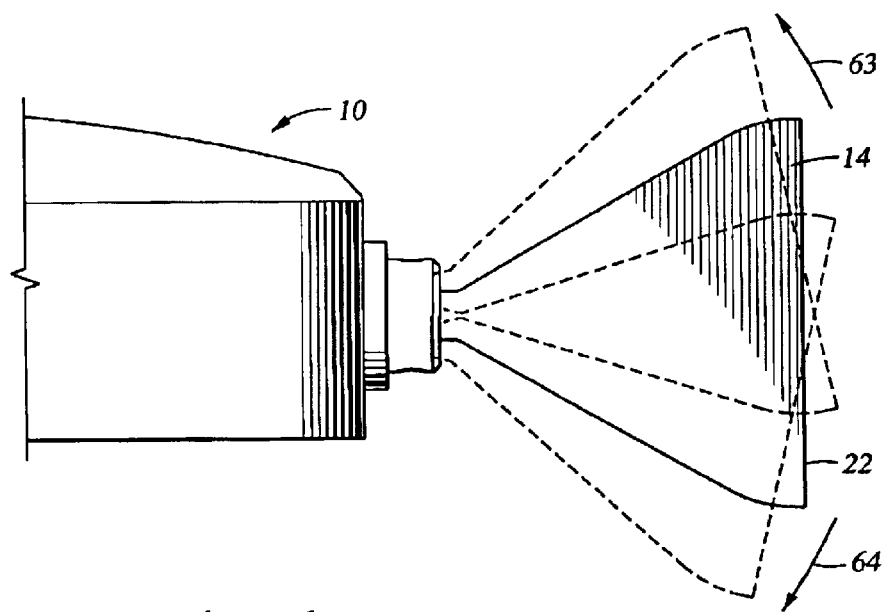

Turning now to FIGS. 5 and 6, the operation of the preferred MOBS fins 14 is shown. FIG. 5 illustrates side to side motion of a fin 14, back and forth along axes 65 and 66. Fin 14 can also rotate clockwise along arc 60 and counterclockwise along 61. Fin 14, is attached to MOBS body 10 at point 54 by a flexible fitting which enables vertical and horizontal motion of the fin as well as rotation. As shown in FIG. 6, fin 14 can also move up and down along arc 63 and 64.

When swimming, the MOBS 10 rotates fins 14 parallel to the direction of travel and moves the fins 14 forward so that they cut through the water with minimum resistance. Once the fins are moved forward the MOBS rotates the fins so that the fins are perpendicular to the direction of travel and move backward in a swimming stroke motion generating maximum resistance against the water and maximum forward thrust. The speed of the back ward stroke and degree of orientation off horizontal to controll thrust is determined by the navigation and control system. This stroke cycle is repeated to propel the MOBS to its desired location.

The buoyancy of each MOBS can be controlled by taking on or expelling water from buoyancy adjustment tank 41. Buoyancy may be varied to adjust to condition of the water column. In deeper water or strong current, it may be desirable to take on water to make the MOBS heavier and less buoyant to lessen drift. A lighter more buoyant MOBS may desired for shallow water and the buoyancy unit will expel water to make the MOBS more buoyant.

At the end of a source airgun firing sequence or seismic data acquisition and survey, the deployed MOBS instruments may either swim to relocate to a new seismic recording location or they may return to a specified collection location at or near the sea surface for retrieval by the surface support vessel. The surface support vessel instructs each MOBS to detach itself from the sea floor and relocate to a new survey area or to the Surface for retrieval. MOBS detachment from the sea floor is achieved by the relative motions of the coupling units or fins, which subsequently transform back to propulsion units for the upward journey as the MOBS swims through the water column to a new survey or to the surface for retrieval. The MOBS navigation technique is the same when returning to the surface or traveling to a new survey area. Once the MOBS instruments arrive at the surface collection point they can be raised to the back deck of the surface support ship and the seismic data may be transferred to storage before retrieval of data for post data acquisition processing. Data retrieval can be performed on the ship or at a remote location. Data can be stored on disk, tape, ROM or transmitted via telemetry, microwave or satellite link.

The foregoing description is intended as an example of a preferred embodiment and not intended to limit the scope of the invention, which is defined by the following claims.

What is claimed is:

1. A seismometer comprising:
    a hydrodynamically efficient shaped body containing a seismic device;
    a propulsion unit located on said body, said propulsion unit comprising a plurality of fins for propelling said body through an ocean to a designated location on an ocean bottom and digging into said ocean bottom to improve coupling and vector fidelity of said seismic device to the ocean bottom; and a control unit for directional control of said propulsion unit.

2. The apparatus of claim 1 further comprising:

a navigation unit for directing the control unit to a desired location on the ocean bottom and utilize said plurality of fins to fine tune an attitude of the body and seismic device with respect to a horizontal reference plane.

3. The apparatus of claim 1 wherein said fins a located on the body so that they oppose each other and each fins lowers a different side of the body when digging into the ocean bottom.

4. The apparatus of claim 3, wherein said apparatus further comprises a predetermined coupling and orientation maneuver with said fins.

5. The method of claim 3, wherein said method further comprises the step for:

performing a predetermined coupling and orientation maneuver with said fins.

6. The apparatus of claim 1, wherein said control unit receives navigation commands and a predetermined coupling and orientation maneuver from a navigation system.

7. The apparatus of claim 6 wherein the control unit communicates an identifier code to the navigation system enabling the navigation system to determine location of the apparatus.

8. The apparatus of claim 7 wherein the navigation system sends a responsive directional command to the apparatus based on the current location and the desired location.

9. The apparatus of claim 1 wherein the propulsion system acts to couple the apparatus to the ocean floor.

10. The apparatus of claim 1 wherein the navigation system comprises a flight control system for managing a plurality of said apparatuses during navigation.

11. The apparatus of claim 10 wherein the flight control system is located on a surface support vessel.

12. A method for deploying a seismometer comprising the steps for:

placing a hydrodynamically efficient shaped body containing a seismic device into water above an ocean bottom;

energizing a propulsion unit located on said body to propel the seismometer through the fluid;

digging into said ocean bottom to improve coupling and vector fidelity of said seismic device to the ocean bottom; and receiving a command in propulsion unit from a control unit for directional control of said propulsion unit.

13. The method of claim 1, further comprising moving fins located on the body so that they oppose each other and so that each fin lowers a different side of the body when digging into the ocean bottom.

14. The method of claim 12 further comprising the step for: receiving a command from a navigation system for directing the control unit to control the propulsion unit to move a desired location on the ocean bottom; and fine tuning an attitude of said body and seismic device with respect to a horizontal reference plane.

15. The method of claim 12, further comprising the step for:

receiving navigation commands and a predetermined coupling and orientation maneuver from a navigation system.

16. The method of claim 15 further comprising the step for:

communicating an identifier code from the control unit to the navigation system enabling the navigation system to determine the location of the body.

17. The method of claim 16 further comprising the step for:

sending a responsive directional command from the navigation system to the control unit based on the current location of the body and the desired location.

18. The method of claim 12 further comprising the step for:

coupling the body to the ocean floor via said propulsion system.

19. The method of claim 12 further comprising the step for:

controlling the flight path for a plurality of bodies.

20. The method of claim 19 wherein the flight control system is located on a surface support vessel.

* * * * *